United States Patent [19]

Burnham, Sr.

[11] 4,155,724

[45] May 22, 1979

[54] APPARATUS FOR THE DEGASIFICATION OF FLUIDS

[76] Inventor: Gerald E. Burnham, Sr., 2000 W. St. Mary Blvd., Lafayette, La. 70501

[21] Appl. No.: 799,936

[22] Filed: May 24, 1977

[51] Int. Cl.² .................................................. B01D 19/00
[52] U.S. Cl. ........................................ 55/193; 55/204; 55/206
[58] Field of Search .................. 55/36, 41, 52, 191, 55/193, 204, 206

[56] References Cited

U.S. PATENT DOCUMENTS

| 3,517,487 | 6/1970 | Burnham, Sr. | 55/192 |
| 3,555,819 | 1/1971 | Burnham, Sr. | 55/170 |
| 3,616,599 | 11/1971 | Burnham, Sr. | 55/193 X |
| 3,973,930 | 8/1976 | Burgess | 55/41 |

Primary Examiner—Charles N. Hart
Assistant Examiner—Richard W. Burks
Attorney, Agent, or Firm—Schuyler, Birch, Swindler, McKie & Beckett

[57] ABSTRACT

Drilling mud degasification apparatus comprises a degassing chamber located below the level of gas-laden mud in a tank. A propeller pump causes the mud in the tank to flow through a plurality of restricted orifices in the degassing chamber at a rate faster than that at which the mud would normally flow through such orifices to liberate the gas bubbles therefrom. A cyclone separator finally separates the so-liberated gas from the mud.

14 Claims, 2 Drawing Figures

APPARATUS FOR THE DEGASIFICATION OF FLUIDS

BACKGROUND OF THE INVENTION

1. Field of the Invention

The present invention relates generally to a method and apparatus for the degasification of a gas-laden fluid and, more particularly, to such a method and apparatus for use with drilling mud compositions.

2. Description of the Prior Art

It is often desirable in various industrial operations to substantially remove gas from a fluid being processed. A prime example of this is in the oil well drilling industry where it is customary to pump substantial quantities of a specially formulated drilling mud down through the drill stem to be discharged through apertures adjacent the drill bit. Not only does the drilling mud lubricate the drill bit and remove the cuttings therefrom, but the weight of the column of drilling mud in the drill stem prevents the escape or blowout of natural gas formations encountered by the drill. However, the drilling mud, in this latter capacity, frequently becomes contaminated in the well with natural gas or air which decreases its weight and viscosity, thus markedly diminishing its effectiveness in preventing blowouts. Since it is uneconomical to continuously supply fresh, uncontaminated drilling mud to the well, it is necessary that the mud be recycled and that the entrained gases therein be removed before the mud is reused in the well.

Numerous prior art systems have been proposed for degassing drilling muds. These systems characteristically utilize a vacuum tank having some sort of baffle structure over which the mud flows in a thin film; the vacuum in the tank causes the gas to escape from the thin film of mud. For example, the applicant's own prior U.S. Pat. No. Re. 27,882 shows such a vacuum tank structure and further discloses separating the liberated gas from the mud in a cyclone separator. Similarly, U.S. Pat. Nos. 580,169 to Washington and 3,229,449 to Hogue show other types of vacuum degassing apparatus. In Washington, supra, the vacuum separator includes an expanding-pipe section having a plurality of upwardly extending ridges which create eddies in the flow of the fluid therethrough, the eddies allowing the gas to be easily withdrawn from the fluid by the vacuum in the pipe. A disadvantage, however, of all such vacuum type drilling mud degassers is the need to generate and maintain a suitable source of vacuum and the need for large, complex baffle structures to spread the mud out into sufficiently thin layers to enable complete degasification thereof.

U.S. Pat. No. 3,769,779 to Liljestrand discloses another type of drilling mud degasser which operates at atmospheric pressure thereby obviating the need for a vacuum system. In Liljestrand (FIGS. 9 and 10), a radial-flow centrifugal pump is disposed below the level of the gas-laden mud held in a mud receiving tank. An upwardly extending vertical conduit connects the centrifugal pump to a gas separator with the outlet of the conduit being opposed by a planar surface. In the operation of Liljestrand's degasser, the centrifugal pump radially thrusts mud from the tank outwardly into the conduit with substantial force such that the mud exiting from the conduit strikes the planar surface and is laterally directed outwardly therefrom in tiny droplets to impinge on the surfaces of the separator. Because the mud is thrown against these surfaces at such high velocity, the gas therein is liberated and may be vented through an outlet while the degassed mud flows downwardly to a degassed mud receiving tank. A disadvantage of the Liljestrand apparatus, however, is the need for a relatively large horsepower centrifugal pump to impart the necessary force to the mud so that the degassing operation takes place properly. Similarly, degassing devices are known which utilize large horsepower jet-type pumps for imparting the necessary flow to the gas-laden drilling mud.

SUMMARY OF THE INVENTION

Accordingly, it is an object of the present invention to obviate the above-noted disadvantages of the prior art by providing a method and apparatus for degassing drilling mud which is extremely low-cost to operate.

It is an additional object of the present invention to provide a method and apparatus for degassing drilling mud which operates at atmospheric pressure and utilizes a relatively low-power propeller-type axial flow pump that is economical to operate when compared to the other types of pumps conventionally used in other degassing devices.

These and other objects of the present invention are provided in a novel apparatus for the degasification of a gas-laden fluid comprising a contaminated fluid tank which receives the gas-laden fluid from a supply source thereof. A degassing chamber is placed in operative communication with the fluid contained inside the contaminated fluid tank. This chamber is preferably, but not necessarily, located below the level of the fluid in the tank so that the fluid therein will exert a positive headpressure at an inlet to the degassing chamber. Means are provided for moving the fluid through the degassing chamber which operatively coacts with passive means inside the chamber to combine and liberate the gas therefrom. Finally, means are provided for separating the so-liberated gas from the fluid to provide a substantially gas-free fluid supply.

BRIEF DESCRIPTION OF THE DRAWINGS

The novel features of the invention are set out with particularity in the appended claims, but the invention will be understood more fully and clearly from the following detailed description of the preferred embodiment of the invention as set forth in the accompanying drawings, in which:

DESCRIPTION OF A PREFERRED EMBODIMENT

In the description that follows, the present invention will be described with reference to the degassing of drilling mud compositions used in petroleum oil wells. It is to be understood, however, that the system can be used for degassing other types of fluids containing entrained or dissolved gas.

Figure 1:
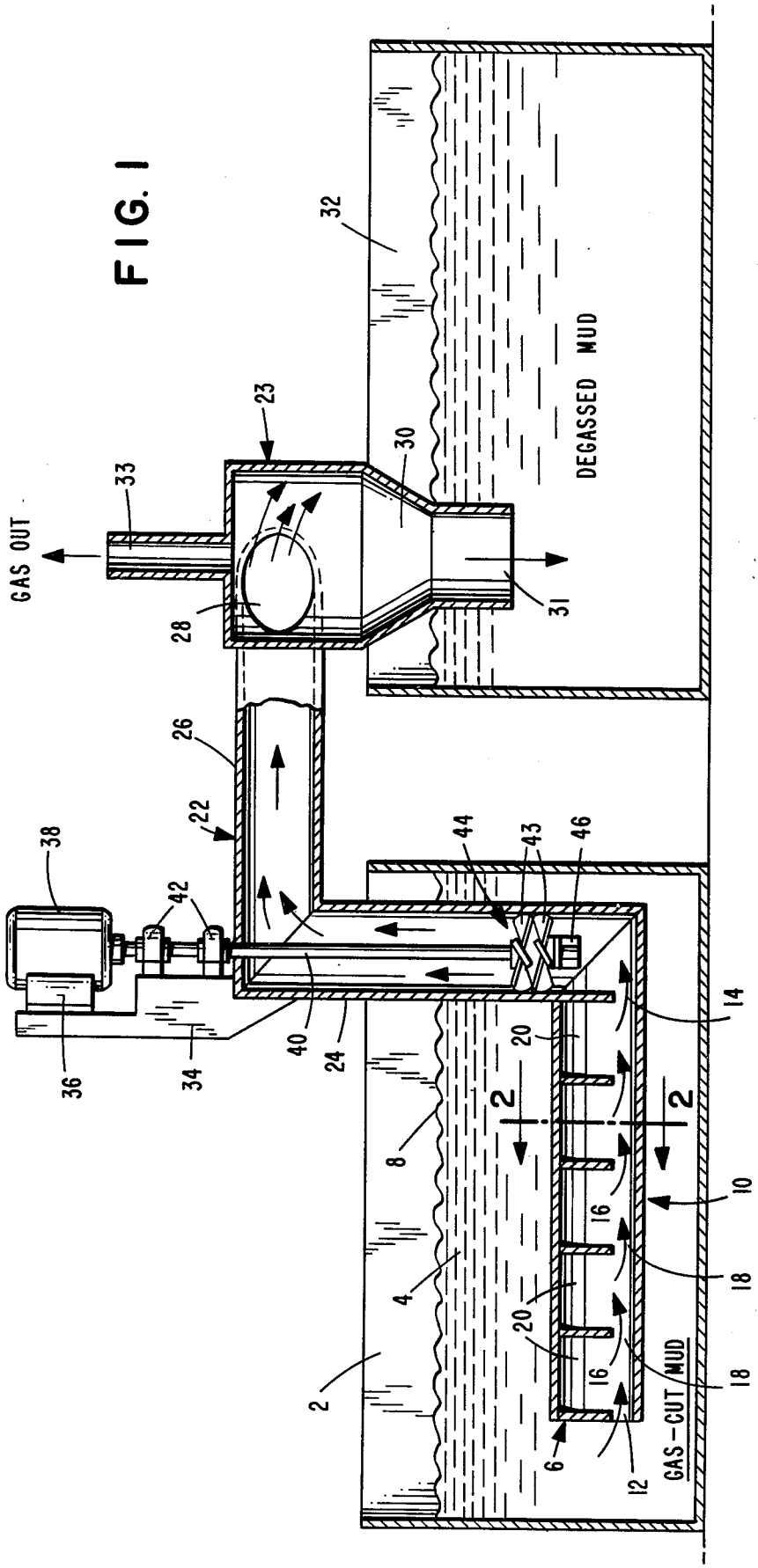
FIG. 1 is a side elevation view of the fluid degasification apparatus according to the present invention.
Figure 2:
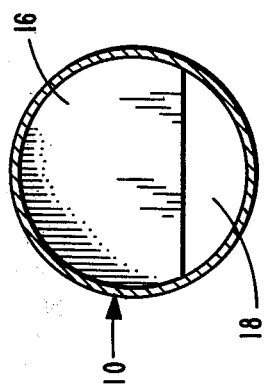
FIG. 2 is a cross-sectional view taken along line 2—2 of FIG. 1.

Referring then to FIG. 1, a gas-laden mud tank 2, or a gas-cut mud tank as it is sometimes called, is arranged at ground level for receiving the contaminated drilling mud 4 coming from a typical oil well (not shown). Contaminated mud 4 comprises any suitable fluid, normally an aqueous suspension of solid matter, that has natural gas or air bubbles entrained or dissolved therein. A degassing chamber 6 is located inside tank 2 below the level 8 of mud 4 in tank 2. Although the level 8 of mud 4 fluctuates somewhat in tank 2, it should always be kept above degassing chamber 6 so that a positive headpressure is created at an inlet 12 of degassing chamber 6. Suitable control apparatus (not shown) may be provided if so desired, such as a ball float control valve, for periodically replenishing contaminated mud 4 in tank 2 whenever the level 8 therein falls too low. Degassing chamber 6 comprises a hollow, elongated, and substantially horizontal cylinder 10 arranged inside tank 2. Cylinder 10 has an inlet 12 for placing the interior thereof in operative communication with gas-laden mud 4 in tank 2 and an outlet 14 for discharging mud therefrom. A plurality of substantially planar baffle plates 16 are fixedly secured to and depend downwardly from the upper portion of cylinder 10 at a plurality of longitudinally spaced locations therein. Baffle plates 16 provide a plurality of restricted orifices 18 at each of these spaced locations through which drilling mud 4 is adapted to flow. Each orifice 18 is followed by an adjacent enlarged zone 20 in cylinder 10.

A conduit 22 connects outlet 14 of degassing chamber 6 to a cyclone separator 23 for a purpose to be described hereafter. Conduit 22 comprises a first, substantially vertical housing 24 suitably fixedly attached to one end to outlet 14 and extending upwardly therefrom to a position outside of tank 2. The upper end of vertical housing 24 is integrally connected to a second, substantially horizontal housing 26 which extends between housing 24 at one end and a tangential inlet 28 of cyclone separator 23 at the other end. Cyclone separator 23 further includes a hopper 30 having an outlet 31 discharging downwardly into a degassed mud receiving tank 32, and a gas vent 33 extending from the top side thereof. Gas vent 33 may lead to atmosphere or to a suitable gas recovery apparatus if so desired.

An upright standard or support beam 34 is attached to one side of vertical housing 24 adjacent the upper end thereof. Standard 34 has a plurality of brackets 36 fixedly attached thereto for supporting a motor 38. Motor 38 has a downwardly extending drive shaft 40 which is guided and supported for rotation by bearing brackets 42 fixed to standard 34. Shaft 40 extends downwardly through an opening in horizontal housing 26 and is located inside vertical housing 24 substantially parallel to the walls thereof as shown in FIG. 1. A plurality of propeller-type blades 43 are mounted on drive shaft 40 adjacent its lower end; blades 43 are maintained on the end of shaft 40 by means of a threaded nut 46 or similar securing means.

Blades 43 are so configured to provide in combination with motor 38 a propeller-type pump 44. As shown in the *Mechanical Engineer's Handbook,* by Lionel S. Marks, Fourth Edition, a propeller-type pump as described herein is one in which the flow therethrough is substantially axial because of the configuration of the blades. See pages 1893-1907 of Marks. Such a pump may be readily contrasted with radial flow or mixed flow centrifugal pumps in which the flow through the pump is wholly or partially disposed in radial planes relative to the pump axis. An advantage of the propeller-type pump 44 used herein over radial or mixed flow centrifugal pumps is that it moves a greater volume of material with less horsepower since no energy is used in imparting a radial motion to the fluid. In addition, the efficiency of radial or mixed flow centrifugal pumps is dependent at least partially upon the density of the fluid being handled; this is not the case with a propeller-type pump 44 whose efficiency is independent of the fluid density. Thus, propeller pump 44 is much more economical and efficient to operate than radial or mixed flow centrifugal pumps and jet-type pumps and, therefore, is preferred. However, pumps other than propeller pumps may be used in the degasification apparatus of the present invention if so desired.

Propeller pump 44 is positioned inside vertical housing 24 closely adjacent outlet 14 of degassing chamber 6 below the fluid level 8 in tank 2. Propeller pump 44 draws the contaminated mud 4 in tank 2 through degassing chamber 6, and further serves to transfer the fluid leaving degassing chamber 6 from outlet 14 through conduit 22 into cyclone separator 23. Motor 38 of pump 44 may be suitably energized by any appropriate power source maintained on or near the degassing apparatus. However, motor 38 is rotated at a sufficient speed to cause propeller pump 44 to draw contaminated mud 4 through degassing chamber 6 at a rate faster than the rate at which the mud would normally flow therethrough due to the headpressure at inlet 12 caused by the mud 4.

In the operation of the instant invention, because pump 44 draws mud 4 through restricted orifices 18 in degassing chamber 6 at a rate faster than that at which it would normally flow therethrough, the pressure on drilling mud 4 in each enlarged zone 20 behind each orifice 18 will increase. Since drilling mud 4 is a substantially incompressible fluid, its velocity will increase while the pressure thereon decreases as it subsequently passes from each enlarged zone 20 through the adjacent orifice 18. Thus, by means of the arrangement of spaced restricted orifices 18, enlarged zones 20 and the rotation of propeller pump 44, the pressure on contaminated mud 4 inside degassing chamber 6 is periodically increased and decreased as it flows therethrough. Such a manipulation of the pressure causes the minute gas bubbles which are dissolved or entrained inside the gas-laden mud 4 to combine or coalesce together and to be liberated from the mud so that relatively large bubbles or pockets of gas are formed which rise to the top of the mud. Once the gas has been extracted in this manner, there is no possibility of it reentraining in the mud since it would take great pressures, temperatures and agitation to reentrain the gas within the mud, and such are not present in the degasification apparatus of the present invention.

As the mud exits through outlet 14 of degassing chamber 6, it will be forced upwardly through vertical housing 24 by propeller pump 44. Since housing 24 is substantially vertical, the gas bubbles which have been combined and liberated inside degassing chamber 6 further rise to the top of the vertical housing 24 and may combine together into even larger segments. Thus, when the liberated gas and drilling mud mixture is finally tangentially injected into cyclone separator 23 by the force of pump 44, the previously liberated gas bubbles will easily be separated from the mud and will proceed out through gas vent 33 while the mud proceeds downwardly through hopper 30 into the degassed mud tank 32. Thus, a gas-free mud supply is provided in tank 32 for recycling and reuse in the oil well.

The apparatus of the present invention also involves a novel method comprising locating a degassing chamber below the level of gas-laden mud being held in a contaminated mud tank and conducting the mud to an inlet in the chamber. The next step comprises periodically increasing and decreasing the pressure on the mud in the degassing chamber to combine and liberate the gas therefrom by moving the mud through spaced, restricted orifices in the chamber at a rate faster than that which the mud would normally have through these orifices. Finally, the present invention includes separating the liberated gas from the mud to provide a gas-free mud supply.

Although the baffle arrangement 16 and propeller pump 44 are preferred in increasing and decreasing the pressure on the mud in degassing chamber 6, any other appropriate means could also be used. Degassing chamber 6 is preferably located inside the gas cut mud tank 2 as illustrated in FIG. 1 to conserve space. However, degassing chamber 6 could be located outside tank 2 as long as it is located below the level 8 of mud 4 therein and as long as inlet 12 to degassing chamber 6 is in operative communication with mud 4 in tank 2 so that a positive headpressure can be effected at inlet 12. Such an orientation with degassing chamber 6 below fluid level 8 decreases the horsepower requirements of pump 44 in drawing mud 4 through degassing chamber 6 since the headpressure at inlet 12 assists this flow. It also ensures that pump 44, which is located closely adjacent outlet 14 of chamber 16 and below fluid level 8 in tank 2, will always be primed for its pumping operation. Furthermore, any type of means suitable for separating the liberated gas from the mud, such as a vacuum apparatus, could be used in place of cyclone separator 23 if so desired.

When the horsepower of pump 44 is not an important economic factor in the operation of the degasification apparatus of the present invention, degassing chamber 6 might be located above fluid level 8 in tank 2. In such an event, pump 44 would be disposed below fluid level 8 in a conduit leading to inlet 12 of degassing chamber 6. In addition, pump 44 would have to have sufficient power to force mud 4 from tank 2 through orifices 18 in chamber 6 at a velocity fast enough to cause the necessary periodic pressure increase and decrease on mud 4 in chamber 6. It is apparent that pump 44 in such an arrangement would have to be considerably more powerful, and hence more expensive to operate, than the pump 44 in the preferred embodiment of FIG. 1. In either alternative, however, pump 44 need not inject the drilling mud into cyclone separator 23 at a very high velocity since the gas has already been substantially liberated from the mud in degassing chamber 6.

Although the present invention has been illustated in terms of a preferred embodiment, it will be obvious to one of ordinary skill in the art that numerous modifications may be made without departing from the true spirit and scope of the invention which is to be limited only by the appended claims.

I claim:

1. An apparatus for the degassification of a gas-laden fluid comprising:

a contaminated fluid tank for receiving the gas-laden fluid from a supply source thereof;

a degassing chamber having an inlet and an outlet with said inlet being in operative communication with the fluid contained inside said contaminated fluid tank;

flow restriction means disposed inside said degassing chamber and defining a restricted passage therein between said inlet and said outlet;

means for moving the gas-laden fluid from said contaminated fluid tank through said degassing chamber and through said outlet to cause said fluid to fill and move through said restricted passage at a sufficient velocity when passing through said restricted passage to vary the pressure on the fluid in said degassing chamber to coalesce the gas in the fluid; and means located downstream from said outlet for separating the coalesced gas from the fluid to provide a substantially gas-free fluid supply.

2. An apparatus according to claim 1 wherein said flow restriction means define a plurality of spaced restricted orifices to periodically increase and decrease the pressure on the fluid in said degassing chamber.

3. An apparatus according to claim 2, wherein said degassing chamber comprises a hollow, elongated cylinder having said orifices disposed at spaced locations along the length of said cylinder.

4. An apparatus according to claim 3, wherein said cylinder is disposed substantially horizontally inside said contaminated fluid tank.

5. An apparatus according to claim 3, wherein said orifices are defined by substantially planar baffle plates fixed inside said cylinder, and each of said baffle plates extends substantially vertically to restrict the area of said cylinder through which the fluid passes at each of said spaced locations.

6. An apparatus according to claim 1, wherein said degassing chamber is located inside said contaminated fluid tank.

7. An apparatus according to claim 1, wherein said moving means comprises a pump located in a conduit which extends between said outlet of said degassing chamber and said separating means.

8. An apparatus according to claim 7, wherein said pump is located adjacent said outlet, and said pump is further adapted to move the fluid from said degassing chamber through said conduit to said separating means.

9. An apparatus according to claim 8, wherein said separating means comprises a cyclone separator.

10. An apparatus according to claim 7, wherein said pump comprises a propeller pump having a substantially axial flow therethrough.

11. An apparatus according to claim 7, wherein said conduit includes a substantially vertical housing for causing the coalesced gas to rise to the top of the fluid therein.

12. An apparatus according to claim 1, wherein said moving means comprises a relatively low-power propeller pump having a substantially axial flow therethrough.

13. An apparatus according to claim 1, wherein said separating means comprises a cyclone separator in operative communication with said outlet of said degassing chamber.

14. An apparatus for the degasification of a gas-laden fluid comprising:

a contaminated fluid tank for receiving the gas-laden fluid from a supply source thereof;

a degassing chamber having an inlet and an outlet with said inlet being in operative communication with the fluid contained inside said contaminated fluid tank;

a plurality of restricted orifices disposed at spaced locations inside said degassing chamber between said inlet and said outlet;

means for moving the gas-laden fluid from said contaminated fluid tank through said degassing chamber and through said outlet to cause said fluid to fill said orifices, said moving means imparting a sufficient velocity to the fluid when passing through said spaced, restricted orifices to periodically increase and decrease the pressure on the fluid in said degassing chamber to coalesce the gas in the fluid; and means located downstream from said outlet for separating the coalesced gas from the fluid to provide a substantially gas-free fluid supply.

* * * * *